(12) United States Patent
Chen

(10) Patent No.: US 7,916,465 B2
(45) Date of Patent: Mar. 29, 2011

(54) HARD DISK FIXING RACK

(75) Inventor: Deng-Hsi Chen, Keelung (TW)

(73) Assignee: Lian Li Industrial Co., Ltd., Keelung (TW)

( * ) Notice: Subject to any disclaimer, the term of this patent is extended or adjusted under 35 U.S.C. 154(b) by 543 days.

(21) Appl. No.: 11/481,948

(22) Filed: Jul. 7, 2006

(65) Prior Publication Data

US 2008/0007908 A1 Jan. 10, 2008

(51) Int. Cl.
*H05K 5/00* (2006.01)
*H05K 7/00* (2006.01)

(52) U.S. Cl. .......... 361/679.39; 361/679.31; 361/679.33

(58) Field of Classification Search .......... 361/679, 361/683, 685, 735, 679.31, 679.33, 679.39
See application file for complete search history.

(56) References Cited

U.S. PATENT DOCUMENTS

| 5,751,551 | A  | * | 5/1998  | Hileman et al. | 361/753   |
| 6,238,026 | B1 | * | 5/2001  | Adams et al.   | 312/223.2 |
| 6,616,106 | B1 | * | 9/2003  | Dean et al.    | 248/27.1  |
| 6,646,871 | B1 | * | 11/2003 | Liao et al.    | 361/685   |
| 7,016,189 | B2 | * | 3/2006  | Lin            | 361/685   |
| 7,031,152 | B1 | * | 4/2006  | Tsai et al.    | 361/685   |
| 2007/0263349 | A1 | * | 11/2007 | Yi et al.   | 361/685   |

* cited by examiner

*Primary Examiner* — Jayprakash N Gandhi
*Assistant Examiner* — Anthony M Haughton
(74) *Attorney, Agent, or Firm* — Muncy, Geissler, Olds & Lowe, PLLC

(57) ABSTRACT

A hard disk fixing rack, which is used to emplace and fix the hard disks used in a computer, is composed of a seat which is fixed in an interior of a computer casing, a rack body, and a plurality of elastic gliding members which are installed on the hard disk. An interior of the rack body is formed with a plurality or rails, such that after the hard disk is gliding on the aforementioned rails, it can be fixed into locking slots at tail ends of the rails.

12 Claims, 7 Drawing Sheets

HARD DISK FIXING RACK

BACKGROUND OF THE INVENTION (a) Field of the Invention

The present invention relates to a hard disk fixing rack which is used in a computer for emplacing the hard disks and fixing their positions, and more particularly to a hard disk fixing rack which can be used to quickly insert and fix the hard disks through a gliding method, and which is provided with a good shock-proof effect.

(b) Description of the Prior Art

As an advancement of computer technology, there are more and more various kinds of multimedia files, such as sound effect files used for playing music, film files used for viewing and reading, ordinary text files used for archiving, or picture files generated by graphics software. Dedicated computer storage media, such as hard disks, floppy disks, or CD-ROM (read-only memory) disks (the ordinary CD-ROM disks also include CDs and DVDs) are used in accessing or storing these data. However, the multimedia files are becoming larger and larger in recent years, and hence a storage capacity is required to be bigger and bigger. The most popular and indispensable storage medium is the hard disk which is provided with a faster accessing speed, a longer persistence of data storage, and a lower cost per unit of storage capacity, as well as more importantly, is able to be used to perform file management (such as adding, deleting, moving, or copying) at any time, as compared to other storage media. Moreover, the hard disk storage is increased in multiples during the recent years; therefore it is a great benefit to many DIY (Do It Yourself) players.

Referring to FIG. 1, an interior of ordinary computer casing 10 is fixed with at least a fixing rack 101 to fix hard disks 20. An internal of the fixing rack 101 is formed with a space for emplacing the hard disks 20, and two opposite side walls of the fixing rack 101 are provided with a plurality of fixing holes 1011 respectively, thereby being able to install at least more than two hard disks 20. However, as the ordinary fixing rack 101 is immovable and its opening is towards a motherboard, it will usually cause an inconvenience in installing. Referring to FIG. 2, in installing the hard disk 20, the hard disk 20 is inserted into the emplacement space inside the fixing rack 101, so as to enable screw holes 201 at two sides of the hard disk 20 to be in alignment with the fixing holes 1011 of fixing rack 101. Then, a plurality of fixing screws 202 is used to screw the hard disk 20 into the fixing rack 101, and next the hard disk 20 is electronically connected to a power of computer and a motherboard. However, this operational procedure is rather minute and complicated, thereby causing an inconvenience in installing. Therefore, an improvement is necessary.

SUMMARY OF THE INVENTION

The primary object of present invention is to provide a hard disk fixing rack which is easy to operate, is able to firmly fix positions of the hard disks, and is provided with a good protection function.

Accordingly, the hard disk fixing rack of present invention, which is able to emplace and fix a plurality of hard disks used in a computer, includes a seat, a rack body, and a plurality of elastic gliding members. The seat is fixed inside a computer casing, a top surface of the seat is installed with a plurality of locking members and elastic members, and a side of the seat is provided with a fixing board. A bottom surface of the rack body is formed with a plurality of through-holes corresponding to the aforementioned locking members, and a side edge of the rack body is formed with an opposite fixing board, such that the rack body can be assembled on the aforementioned seat. In addition, an interior of the rack body is formed with a plurality of rails which are provided with locking slots, to emplace the aforementioned hard disks. On the other hand, the plural elastic gliding members are installed at two opposite sides of the hard disk respectively, such that after the hard disk is gliding on the aforementioned rails of rack body, the elastic gliding members on the hard disk can be locked into the locking slots at two ends of the rails, thereby fixing a position of the hard disk.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
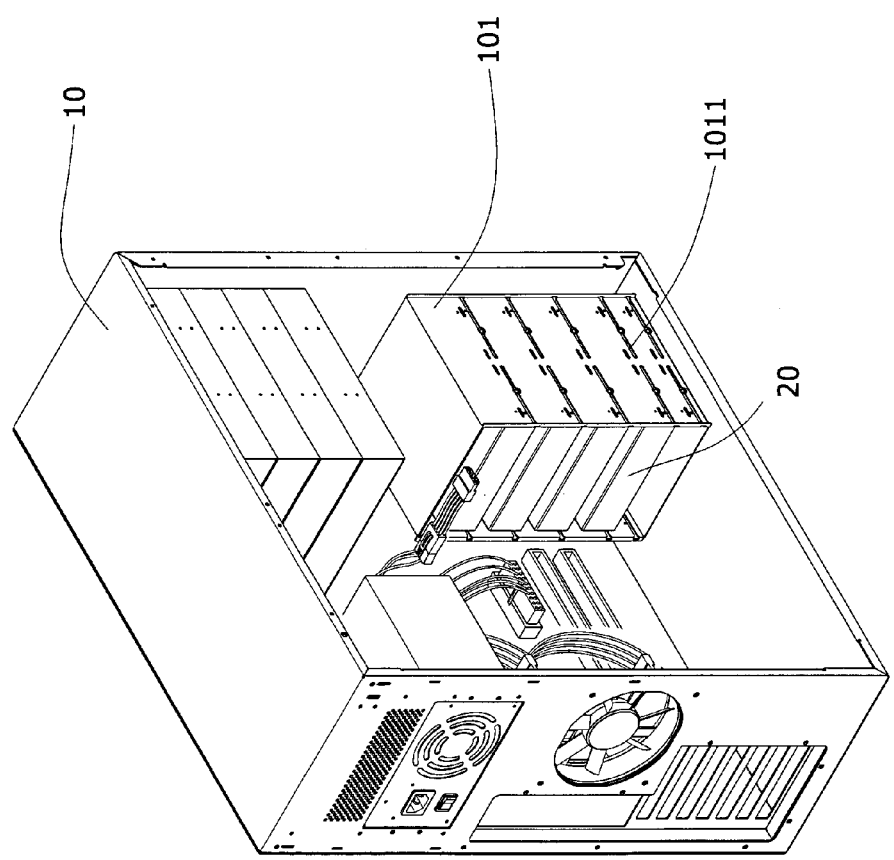
FIG. 1 shows a schematic view of a structure of a conventional hard disk fixing rack of a computer.
Figure 2:
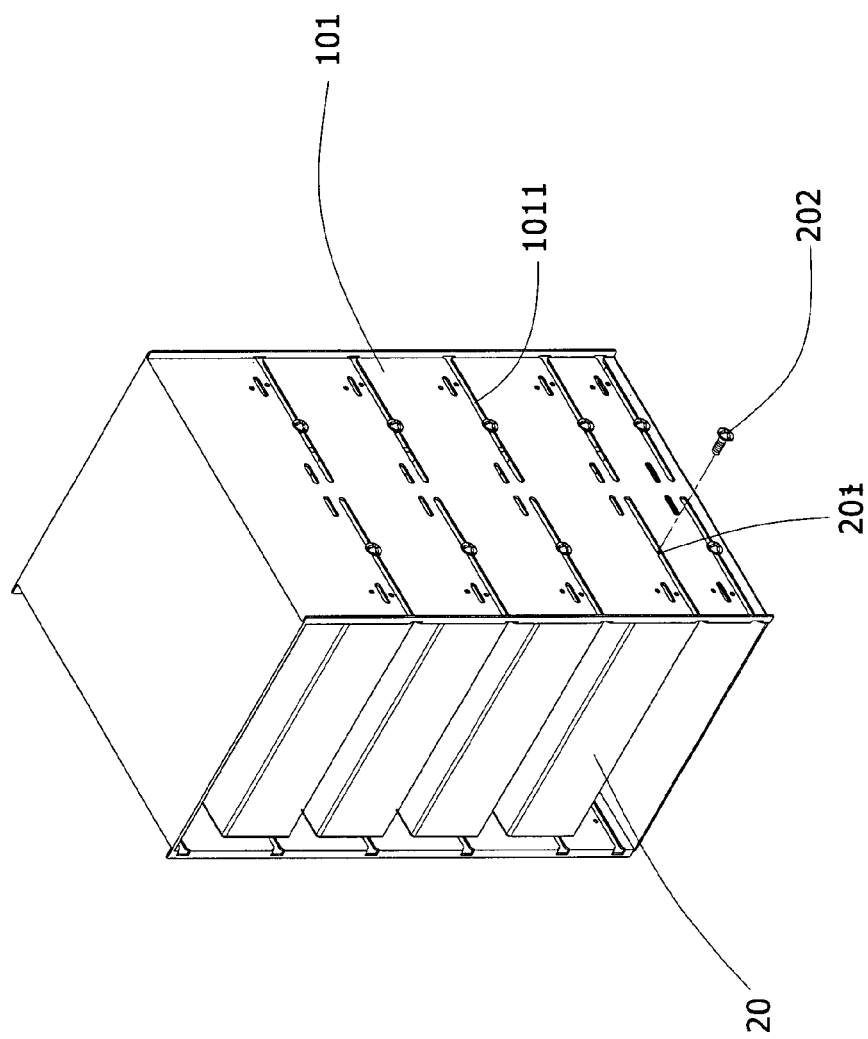
FIG. 2 shows a schematic view upon installing a conventional hard disk fixing rack.
Figure 3:
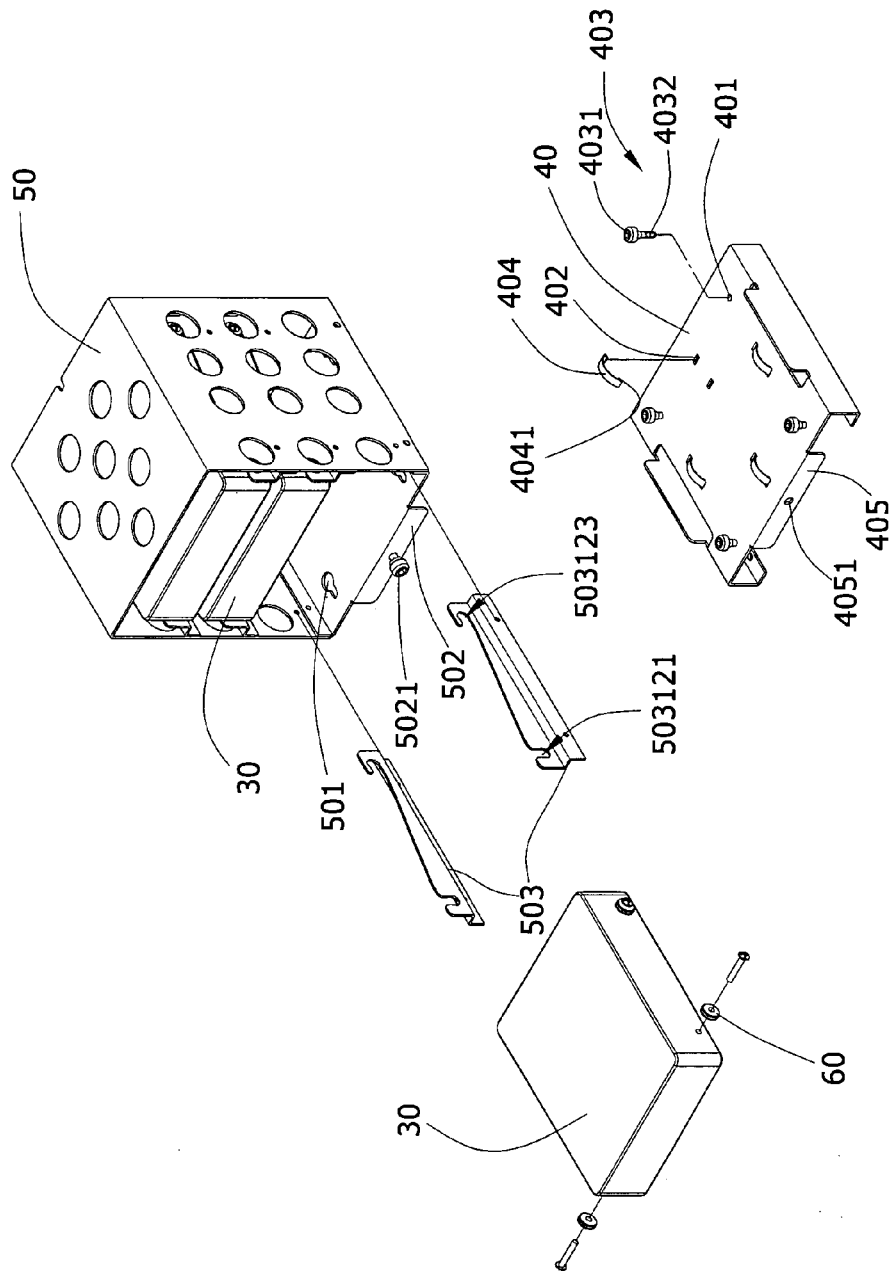
FIG. 3 shows an exploded view of the present invention.

Referring to FIG. 3, a hard disk fixing rack of the present invention, which is used to emplace and fix a plurality of hard disks 30 used in a computer, comprises primarily a seat 40, a rack body 50, and a plurality of elastic gliding members 60. The seat 40 is riveted on a bottom surface inside a computer casing for assembling the aforementioned rack body 50, and a top surface of the seat 40 is provided with a plurality of fixing holes 401 and locking slots 402 respectively; whereas interiors of these fixing holes 401 and locking slots 402 are installed with a plurality of corresponding locking members 403 and elastic members 404 respectively. The locking member 403 is a gliding screw, an end of which is a gliding part 4031, and the other end of which is a screwing part 4032 corresponding to the aforementioned fixing hole 401. In addition, the elastic member 404 is a spring leaf, and two ends of which are formed with fixing parts 4041 which are locked correspondingly at the aforementioned locking slots 402, respectively. A side of the seat 40 is provided with a fixing board 405 on which is opened with a fixing screw-hole 4051. On the other hand, a bottom surface of the rack body 50 is formed with a plurality of through-holes 501 corresponding to the aforementioned locking members 403, and a side edge of the rack body 50 is formed with an opposite fixing board 502 on which is provided with a composite screw 5021 corresponding to the aforementioned fixing hole 4051. The locking members 403 on the seat 40 are transfixed into the through-holes 501 of rack body 50, and the elastic members 404 are elastically abutted on the bottom surface of rack body 50 and are shifted relatively, such that the fixing board 405 of seat 40 can be aligned with the opposite fixing board 502 of rack body 50. Then, the composite screw 5021 of the opposite fixing board 502 is screwed into the fixing screw-hole 4051 of fixing board 405, so as to assemble the rack body 50 on the seat 40. An interior of the rack body 50 is formed with a plurality of rails 503 which are provided with locking slots 503121, 503123. These rails 503 are overlapped and can provide a gliding and fixing for the hard disks 30. Moreover, the plural elastic gliding members 60 are installed at two opposite sides of the hard disk 30, respectively. These elastic gliding members 60 are made by a material that can buffer a shock and impact and are formed into rollers at two sides of the hard disks 30, enabling the hard disks 30 to be gliding on the aforementioned rails 503 of rack body 50, and then to be squeezed into the locking slots 503121, 503123 at two ends of the rails 503 to be locked, by using an elasticity of the elastic gliding members 60, thereby fixing the positions of hard disks 30, and providing a protection of a proper buffering to the shock or impact for the hard disks 30.

Figure 4:
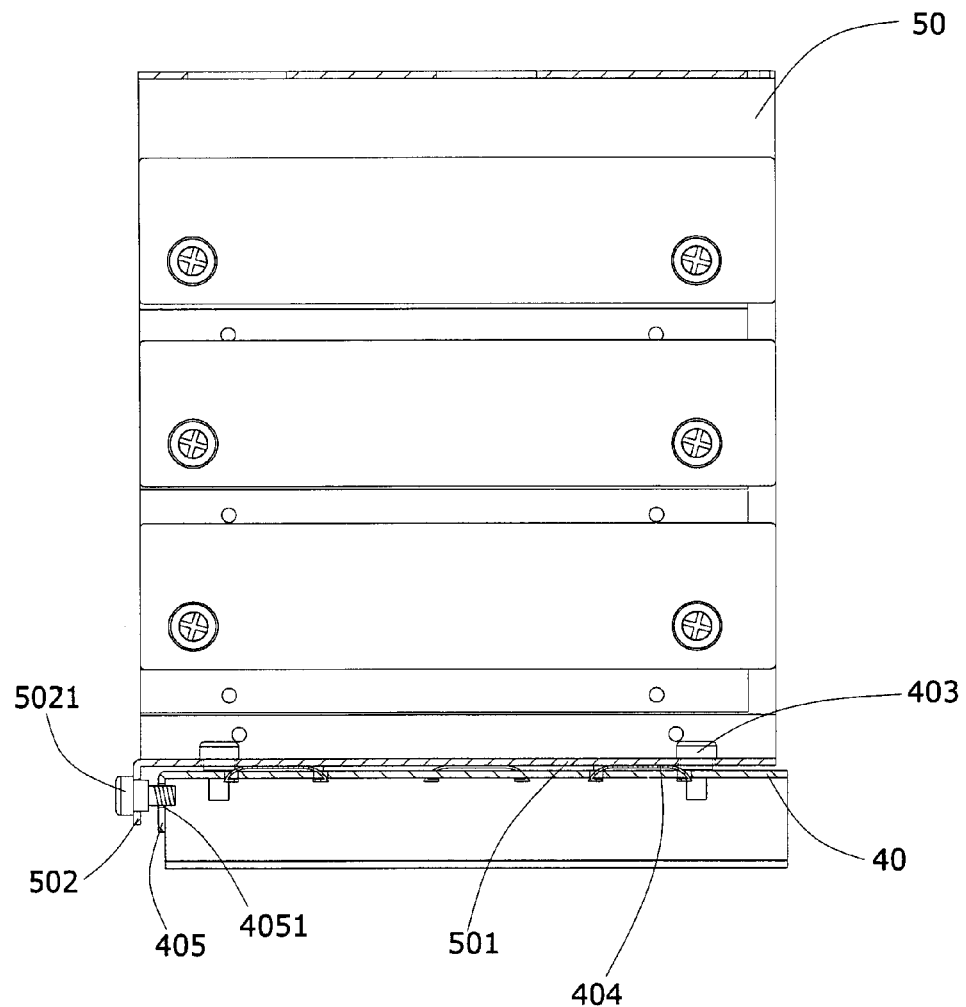
FIG. 4 shows a cutaway view upon assembling a seat and a rack body of the present invention.

Referring to FIG. 4, the seat 40 is riveted and fixed on a bottom panel inside the computer casing. The rack body 50 is assembled with the seat 40 by using the plural locking members 403 and elastic members 404 on the top surface of seat 40, the fixing board 405 at one side of the seat 40, the plural through-holes 501 on the bottom surface of rack body 50, and the opposite fixing board 502 at one side of the bottom surface of rack body 50. In assembling the rack body 50 and the seat 40, the locking members 403 of the seat 40 are aligned with and transfixed into the through-holes 501 of rack body 50, and the elastic members 404 are elastically abutted on the bottom surface of rack body 50, such that the fixing board 405 of seat 40 can be aligned with the opposite fixing board 502 of rack body 50. Next, the composite screw 5021 of opposite fixing board 502 is screwed into the fixing screw-hole 4051 of fixing board 405, thereby achieving a purpose of fixing the rack body 50 on the seat 40.

Figure 5:
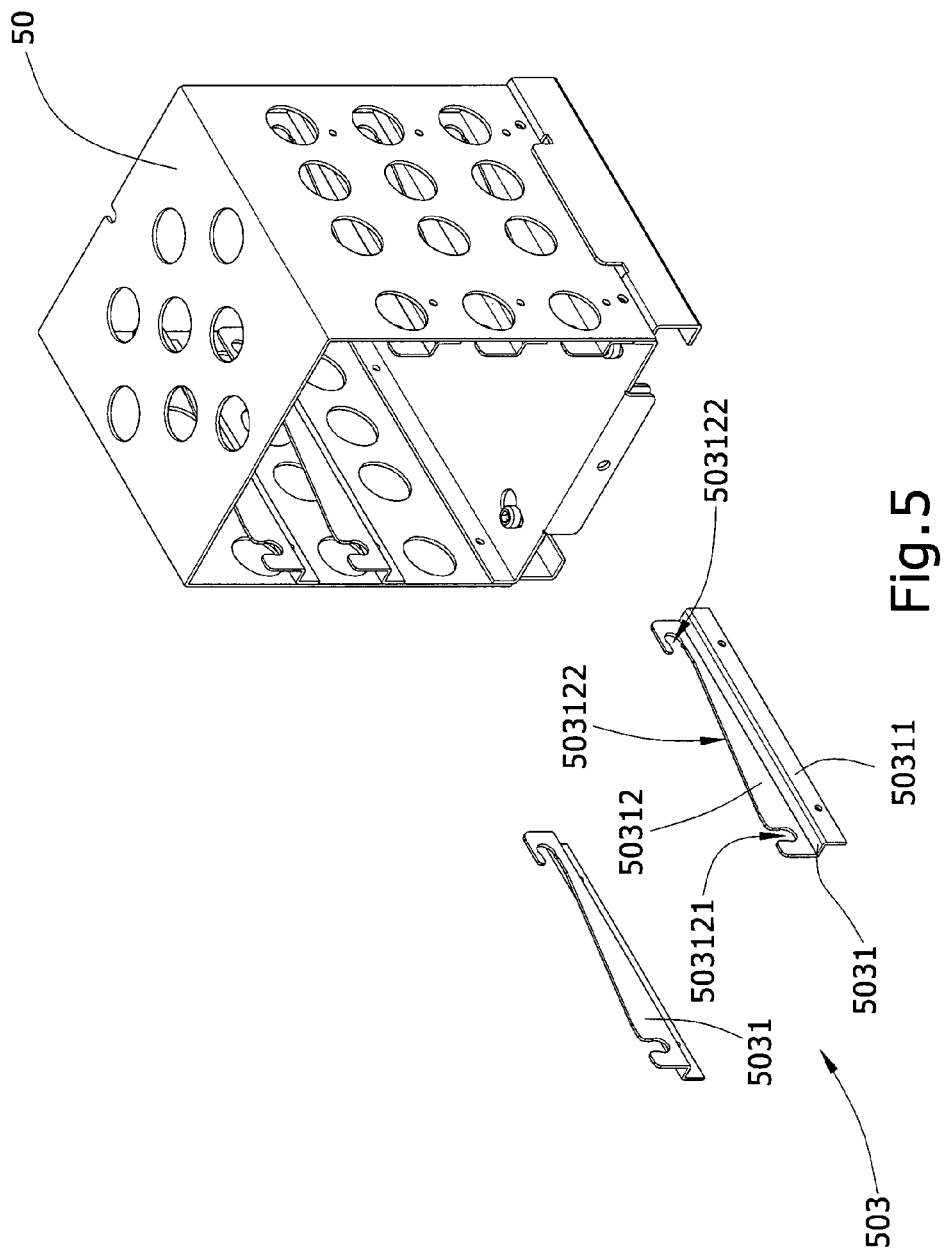
FIG. 5 shows a schematic view of a rail structure of the present invention.

Referring to FIG. 5, the rail 503 inside the rack body 50 is composed of two opposite gliding hooks 5031 which are formed with a parallel fixing piece 50311 and a gliding piece 50312. The fixing piece 50311 is fixed on an inner surface of the aforementioned rack body 50, and a rear end of the gliding piece 50312 is formed with a locking slot 503121 which extends in slant toward a front to from an extended gliding area 503122, whereas a front end of the gliding piece 50312 is formed with a locking slot 503123 in a shape of inverted hook.

Figure 6:
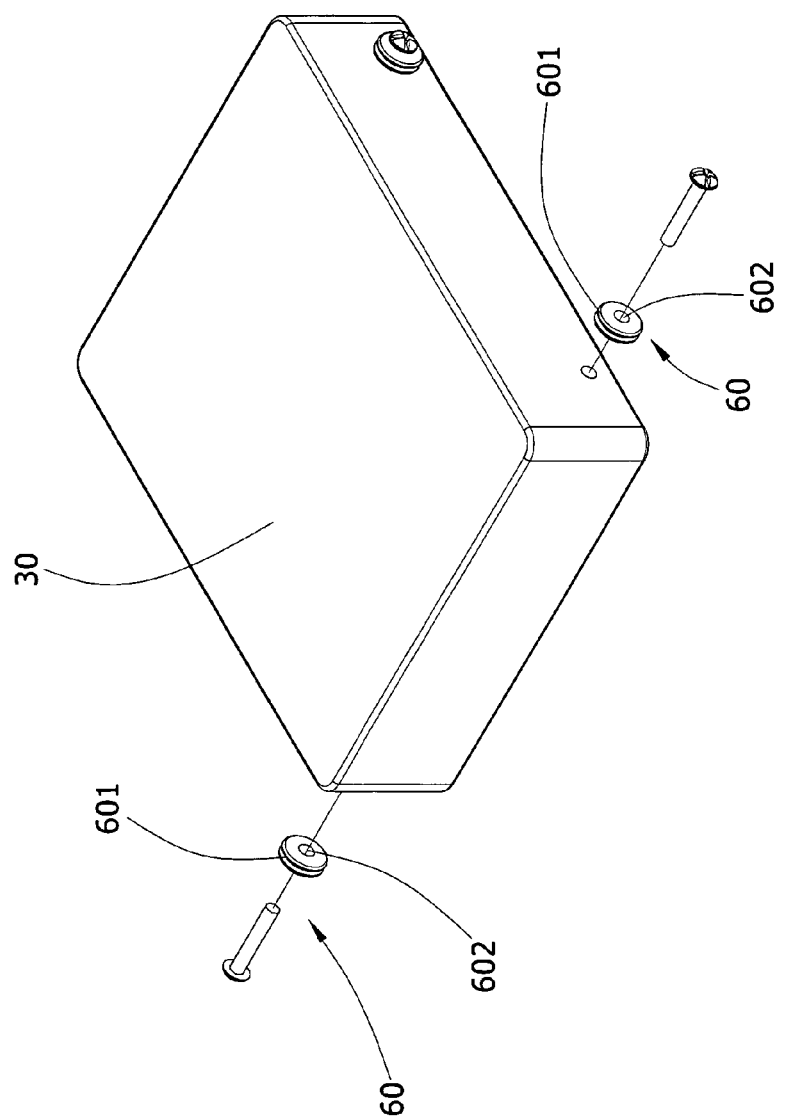
FIG. 6 shows a schematic view upon installing an elastic gliding member of the present invention.

Referring to FIG. 6, the elastic gliding member 60 used in the present invention is in a form of roller, a side edge of the elastic gliding member 60 is cut into a groove ring 601 with a width corresponding to a thickness of the aforementioned gliding hook 5031, and a center of the elastic gliding member 60 is opened with a through-hole 602. Proper screws are used to fix these elastic gliding members 60 at two opposite sides of the hard disk 30 respectively, such that the two opposite sides of the hard disk 30 are provided with the rollers to facilitate the hard disk 30 to be gliding inside the aforementioned rails 503 of rack body 50.

Figure 8:
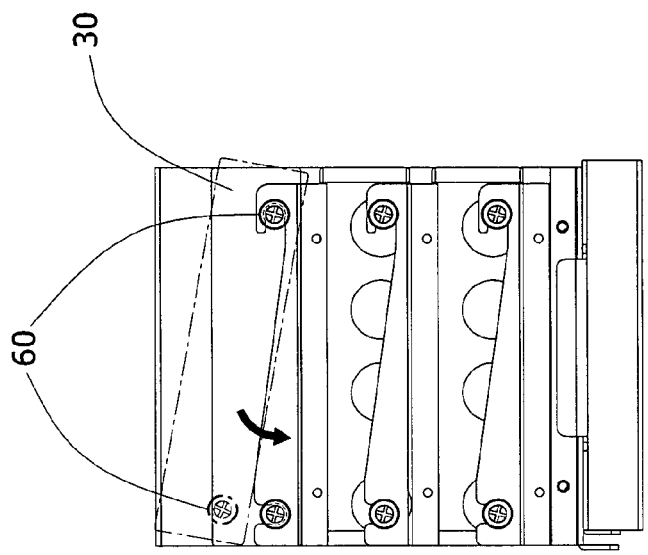
FIG. 8 shows another schematic view upon using the present invention.
Figure 7:
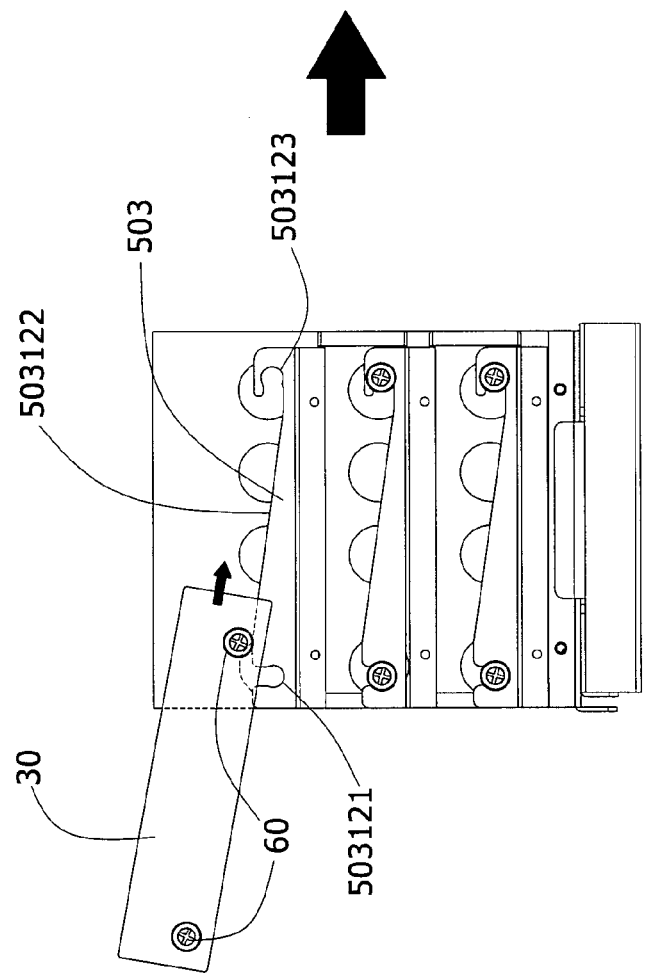
FIG. 7 shows a schematic view upon using the present invention.

Referring to FIG. 7 and FIG. 8, the plural elastic gliding members 60 are first installed at two opposite sides of the hard disk 30, such that the hard disk 30 is provided with the rollers. Then, the hard disk 30 is inserted into the rails 503 by gliding, whereas the elastic gliding members 60 at a front end of the hard disk 30 are gliding forward along the gliding areas 503122 of the rails 503. After the elastic gliding members 60 at the front end are squeezed into the locking slots 503123 at the front end of rails 503, the elastic gliding members 60 at the rear end of hard disk 30 are pressed downward into the locking slots 503121 at the rear end of rails 503, thereby achieving a purpose of fixing the hard disk 30. This operation is rather easy, and as the elastic gliding members 60 can be made by the material that buffers the shock and impact, the fixing rack provides a good protection to the hard disk 30 under a normal condition of high speed operation after it is fixed.

Accordingly, after implementing the present invention, the hard disk can be installed after separating the rack body from the seat, or the hard disk can be installed inside the computer casing after assembling the rack body and the seat. The installation operation is rather easy, and the hard disk is squeezed into the locking slots of rails by the roller-shape elastic gliding members, so as to achieve the purpose of fixing the hard disk. Therefore, a kind of hard disk fixing rack which is easy to operate is accurately provided, which can firmly fix the position of hard disk, and is provided with a good protection function.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A hard disk fixing rack, which is used to emplace and fix a plurality of hard disks used in a computer, comprising a seat fixed in an interior of a computer casing, a top surface of which is installed with a plurality of locking members and elastic members, and a side of which is formed with a fixing board; a rack body, a bottom surface of which is formed with a plurality of through-holes corresponding to the locking members, a side edge of which is formed with an opposite fixing board to assemble the rack body on the seat, and an interior of which is formed with a plurality of rails having locking slots, to emplace the plural hard disks; and a plurality of elastic gliding members which are installed at two opposite sides of the hard disk, such that after the hard disk is gliding on the rails, the plural elastic gliding members of the hard disk can be locked into the locking slots at two ends of the rails, so as to fix a position of the hard disk, wherein the rail is composed of two opposite gliding hooks which are formed with a parallel fixing piece and a gliding piece; the fixing piece being fixed on the aforementioned rack body, a rear end of the gliding piece being formed with a locking slot which extends in a slant towards a front to form an extended gliding area, and a front end of the gliding piece being formed with a locking slot in a shape of inverted hook.

2. The hard disk fixing rack according to claim 1, wherein the seat is provided with a plurality of fixing holes to provide positions to install the plural locking members.

3. The hard disk fixing rack according to claim 1, wherein the seat is provided with a plurality of locking slots to install the plural elastic members.

4. The hard disk fixing rack according to claim 1, wherein the locking member is a gliding screw.

5. The hard disk fixing rack according to claim 4, wherein an end of the gliding screw is a gliding part and the other end is a screwing part corresponding to the aforementioned fixing hole.

6. The hard disk fixing rack according to claim 1, wherein the elastic member is a spring leaf.

7. The hard disk fixing rack according to claim 6, wherein two ends of the spring leaf are formed with fixing parts which are locked at the aforementioned locking slots, respectively.

8. The hard disk fixing rack according to claim 1, wherein the seat is riveted and fixed on a bottom panel inside the computer casing.

9. The hard disk fixing rack according to claim 1, wherein the fixing board is opened with a fixing screw-hole.

10. The hard disk fixing rack according to claim 1, wherein the opposite fixing board is provided with a composite screw.

11. The hard disk fixing rack according to claim 1, wherein the elastic gliding member can be made by a material that buffers a shock and impact.

12. The hard disk fixing rack according to claim 1, wherein the elastic gliding member is a roller, a side edge of which is cut into a groove ring with a width corresponding to a thickness of the gliding hook, and a center of which is opened with a through-hole.

* * * * *